(12) United States Patent
Harris et al.

(10) Patent No.: US 7,565,952 B2
(45) Date of Patent: Jul. 28, 2009

(54) SMALL FOOTPRINT SELF CHECKOUT METHOD

(75) Inventors: Richard H. Harris, Raleigh, NC (US); Hollis P. Posey, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 10/390,964

(22) Filed: Mar. 18, 2003

(65) Prior Publication Data

US 2004/0182650 A1    Sep. 23, 2004

(51) Int. Cl.
*A63F 9/02* (2006.01)
(52) U.S. Cl. .............................. 186/66; 186/59; 186/61
(58) Field of Classification Search ................... 186/59, 186/61, 66; 705/16, 400, 414; 177/25.15, 177/263; 382/100, 110, 141–143, 162–167, 382/170, 199, 209
See application file for complete search history.

(56) References Cited

U.S. PATENT DOCUMENTS

| | | | |
|---|---|---|---|
| 4,792,018 A | | 12/1988 | Humble et al. |
| 5,083,638 A | * | 1/1992 | Schneider ................... 186/61 |
| 5,115,888 A | | 5/1992 | Schneider |
| 5,125,465 A | | 6/1992 | Schneider |
| 5,437,346 A | | 8/1995 | Dumont |
| 5,494,136 A | | 2/1996 | Humble |
| 5,497,314 A | | 3/1996 | Novak |
| 5,540,301 A | | 7/1996 | Dumont |
| 5,747,784 A | | 5/1998 | Walter et al. |
| 5,992,570 A | | 11/1999 | Walter et al. |
| 6,032,128 A | | 2/2000 | Morrison et al. |
| 6,056,087 A | | 5/2000 | Addy et al. |
| 6,080,938 A | | 6/2000 | Lutz |
| 6,189,789 B1 | | 2/2001 | Levine et al. |
| 6,236,736 B1 | * | 5/2001 | Crabtree et al. ............. 382/103 |
| 6,363,366 B1 | * | 3/2002 | Henty ........................ 705/400 |
| 6,550,583 B1 | * | 4/2003 | Brenhouse ................... 186/66 |
| 2002/0071595 A1 | * | 6/2002 | Pirim ......................... 382/107 |
| 2003/0024982 A1 | * | 2/2003 | Bellis et al. ................. 235/383 |

* cited by examiner

*Primary Examiner*—Jeffrey A Shapiro
(74) *Attorney, Agent, or Firm*—Sawyer Law Group LLP

(57) ABSTRACT

Aspects of a self checkout method are described. The method includes utilizing an imaging scanner to image products being purchased; providing a bag rack with scales substantially adjacent the imaging scanner for holding a bag to receive imaged products; and utilizing a computer system to process data from the imaging scanner and the bag rack to ensure complete and secure product purchasing. The method also includes utilizing the computer system to process image data from the product imaging scanner to track movement of each imaged product relative to the bag rack and determine whether each imaged product is entering or exiting the bag.

11 Claims, 2 Drawing Sheets

SMALL FOOTPRINT SELF CHECKOUT METHOD

FIELD OF THE INVENTION

The present invention relates to self checkout systems and more particularly to a self checkout system that uses minimal floor space.

BACKGROUND OF THE INVENTION

Self checkout is becoming a popular solution for merchants who wish to reduce front end labor expense and allow their customers convenience, reduced time at the checkout counter, and privacy. While offering these benefits, a preferred feature is that the self checkout counter consume minimal floor space. This is particularly important in drug stores or convenience stores where space is usually extremely limited.

Of further importance is protection against theft and fraud, which is an inherent risk when the customer is allowed to perform the checkout. Some efforts to provide security for a self checkout system interfere with the primary objectives of the self checkout solution. For example, a self checkout system from PSI (Productivity Solutions Incorporated) utilizes an optical grid to confirm shape parameters at the beginning of a long security tunnel. This system is nearly eleven feet in length and requires items to be scanned and placed on a belt, which transports the items through the tunnel. At the end of the tunnel, the items can be bagged. While providing a level of security, the length and size of the tunnel have a significant footprint. Such floor space consumption limits the ability to conveniently include the system in many store environments.

Accordingly, a need exists for a self checkout system that consumes very little space and does not compromise security. The present invention addresses such a need.

SUMMARY OF THE INVENTION

Aspects of a self checkout system are described. The system includes a product imaging scanner. Also included is a bag rack with scales substantially adjacent the product imaging scanner for holding a bag to receive imaged products. A computer system is coupled to the product imaging scanner and the bag rack for processing data from the product imaging scanner and the bag rack to ensure complete and secure product purchasing.

Through the present invention, the ability to perform self checkout is achieved with a system that has a small footprint. The integrated system for self checkout includes significant security capabilities to avoid potential fraudulent purchase activity. These and other advantages of the aspects of the present invention will be more fully understood in conjunction with the following detailed description and accompanying drawings.

DETAILED DESCRIPTION OF THE INVENTION

The present invention relates to a self checkout system that uses minimal floor space. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
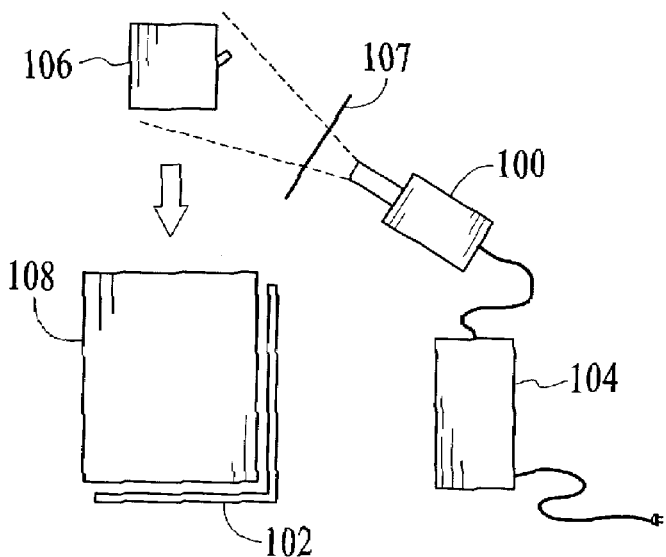
FIG. 1 illustrates a diagram of a small footprint checkout system in accordance with the present invention.

FIG. 1 shows a self checkout system 50 in accordance with the present invention. In a preferred embodiment all items being purchased with the self checkout system 50 either have been identified or are tagged with identification means like a bar code. Bulk, unmarked items could be weighed and marked elsewhere in the store, e.g., meat packaged by a butcher for an individual shopper in a grocery store. However, system 50 works best in a convenience store or drug store where substantially all items have been previously marked.

Referring to FIG. 1, the self checkout system 50 includes an imaging device 100. The system 50 also includes a bag rack with scales 102 located substantially adjacent to the imaging device 100. Finally the system 50 includes a computer processing system 104, which communicates with both the imaging device 100 and bag rack 102, and is capable of communication with customers and store employees, as is well appreciated by those skilled in the art. Although not shown, a display device may also be included to provide feedback, such as item name and price, to the customer during the self checkout procedure. Further, a secondary surveillance camera (not shown) may also be included if desired. In operation, a customer presents an item 106 to be purchased to a window 107 behind which the imaging device 100 is positioned until a "beep" (or other signaling mechanism) signifies that an item 106 has been imaged and identified. The item 106 should then be placed directly into the bag 108. Although this system works particularly well in an environment where most orders can be packed into a single bag, however, once the bag 108 is full, it may be removed and another bag packed until the order is complete.

As shown by FIG. 1, the self checkout system of the present invention achieves the objective of requiring minimal floorspace, i.e., of having a small footprint. A central component that facilitates the small footprint is the provision of the imaging device 100 by an imaging scanner, such as those available from Intermec, or Handheld Products, etc. The imaging scanner sends the image data to the computer system 104 for processing to achieve product identification. In accordance with a preferred embodiment, a database, formed with any suitable database program and stored in computer system 104, provides item identification data. For example, the identification data includes visual characteristics, including bar code, shape, color, texture, etc., as well as weight data for each item 106. Based on at least one of the visual characteristics identified by the computer system 104 from the processed image data for the item 106, the computer system 104 can identify the item 106 and perform comparisons based on the other identifying data in the database to confirm the identity of the item 106. Further, a change in weight as measured with data from the scales of the bag rack 102 can also be compared to an expected weight change as computed by the computer system 104 based on the stored weight data of the item 106 in the database and the last measured weight registered by the scales. Performing these comparisons in the computer system 104 allows potential fraudulent activity to be detected, examples of which are described further hereinbelow.

In parallel with the identification confirmation, multiple frames of video images are examined in the computer system 104 to determine whether the item 106 is entering the bag 108 or exiting the bag 108, i.e., to perform item tracking. Similar methods are currently used by systems that track people movement, e.g., in stores and airports, and are well understood by those skilled in the art. In this manner, movement of the item 106 directly into the bag substantially immediately following the scanning is monitored. Violation of the movement causes a warning to be signaled, particularly if visual characteristics and item tracking identify an item that is moving toward the bag without the bar code being read. For example, an alarm or instruction message is supplied by the computer system 104.

Figure 2:
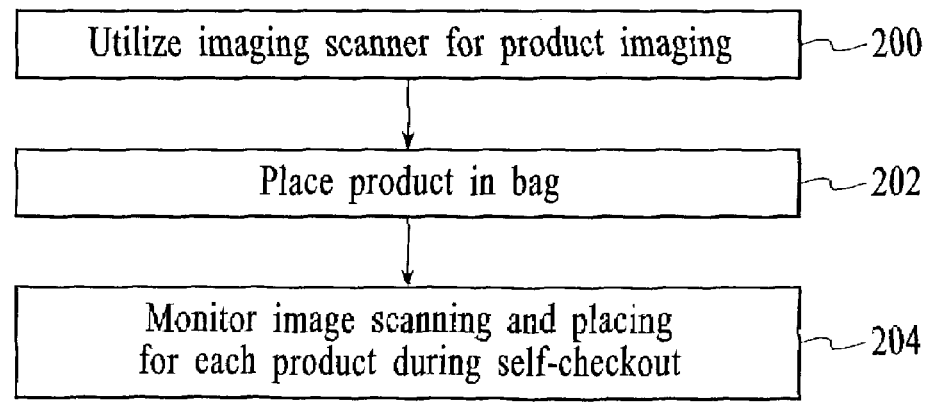
FIG. 2 illustrates a block flow diagram of a method for self checkout in accordance with the present invention.
Figure 3:
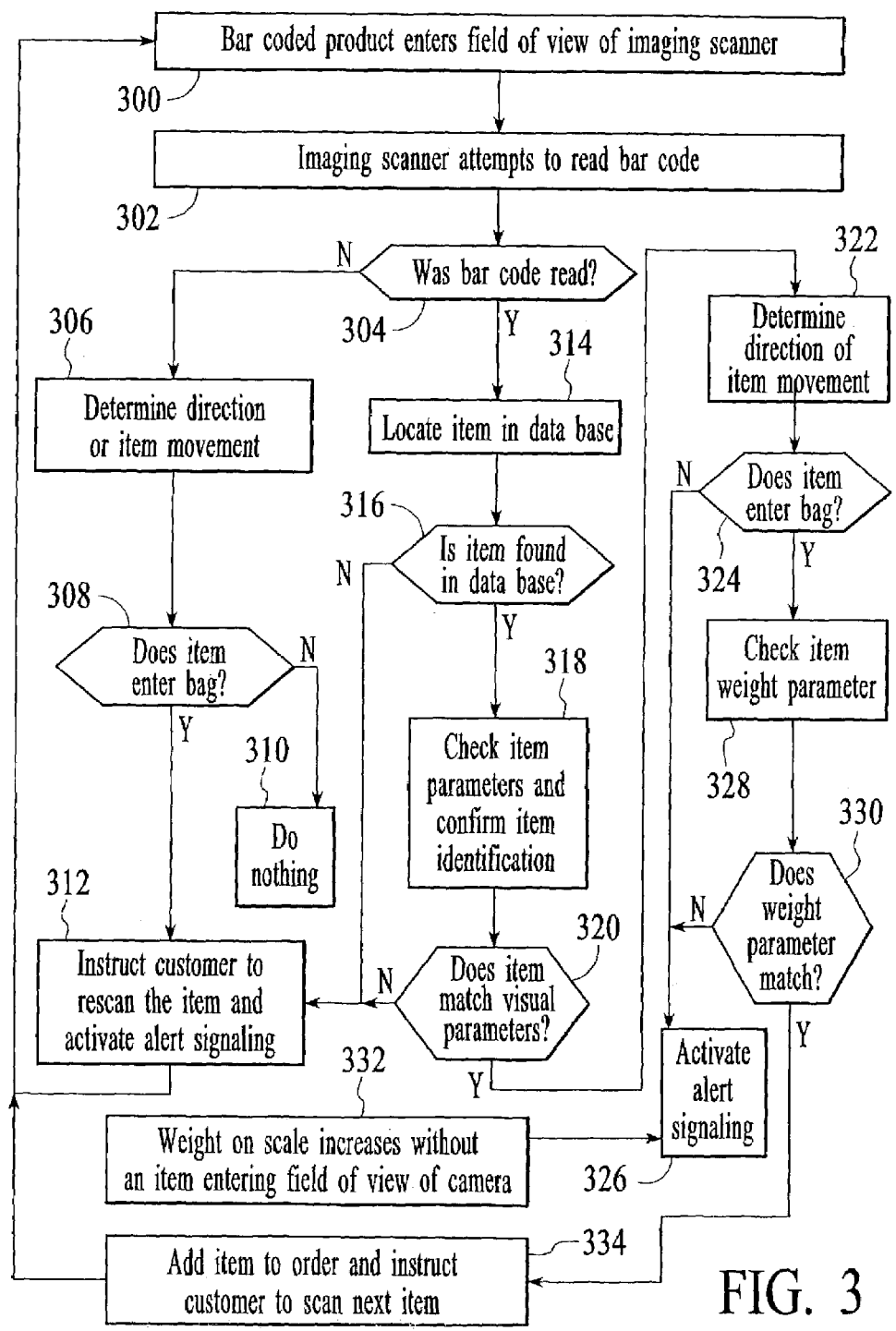
FIG. 3 illustrates a block flow diagram of an example of the method of FIG. 2.

An overall block diagram of a method for self checkout is presented with reference to FIG. 2, while FIG. 3 presents a more detailed representation for an example embodiment. Referring to FIG. 2, self checkout occurs in accordance with the present invention by utilizing an imaging scanner 100 to produce product images (step 200). Placement into a bag substantially immediately follows the product imaging, as facilitated by the proximity of the imaging scanner 100 to the bag rack 102 (step 202). Continual processing by the computer system 104 during the steps of product imaging and placement achieves product identification in a manner that utilizes at least one of the stored set of item characteristics for a basic identification and uses one or more of the other characteristics in the stored set to confirm the product identification, as well as detection of potential fraudulent activity during the self checkout (step 204).

Referring now to FIG. 3, the method for self checkout is presented in an example embodiment where the at least one characteristic that is used initially to identify the item is the bar code. Thus, the process begins when a bar coded product enters the field of view of the imaging scanner (step 300). The imaging scanner then attempts to read the bar code (step 302). If the bar code was not read, as determined via step 304, the direction of the item movement is checked (step 306). If the item does not enter a bag, as determined via step 308, no action is taken (step 310). If the item does enter the bag, the customer is instructed to rescan the item and alert signaling is activated, e.g., store personnel is notified, (step 312). The process then returns to detect a scanning action (step 300).

When the bar code is read (i.e., step 304 is affirmative), the item is located in the database (step 314). If the item cannot be located in the database, as determined via step 316, the process continues with the instruction to rescan step 312. When the item is in the database (i.e., step 316 is affirmative), a verification of the item occurs by checking the item parameters (step 318) and comparing the item parameters against the visual parameters of the images of the item that was scanned (step 320). If there is a mismatch, the rescan step 312 follows.

When the visual parameters do match the item parameters, the image data is processed to determine the direction of item movement (step 322). If the item does not enter the bag, as determined via step 324, signal activation occurs to indicate potential fraudulent activity (step 326). Similarly, if the item does enter the bag (step 324 is affirmative), but, after checking the weight parameter for the item (step 328), the determination is made that the weight measured does not match the weight parameter (step 330 is negative), signal activation occurs (step 326). Signal activation also occurs when an unexpected increase in the weight measured occurs without an item entering the field of view of the camera (step 332).

When the weight parameter does match the weight increase measured (i.e., step 330 is affirmative), the item is added to the order and the customer is instructed to scan the next item (step 334). The process then returns to the initial step 300 and the detection of an item entering the field of view of the camera.

With the present invention, a self checkout system is provided that requires minimal floorspace and performs secure and complete item purchasing. Through the use of item tracking, visual characteristics, and weight checking, the system satisfies the need for detecting potential fraudulent activity, which includes, for example: the placement of an item into the bag without scanning; an attempt by a shopper to tamper with a bar code by pasting the bar code from a less expensive item onto an item that is more expensive; an attempt to scan one item and place a more expensive item into the bag; or an attempt to place a small item inside a larger item prior to checkout. Further, an action that might appear to be simply rearranging the items in the bag, an item of similar weight could be substituted for another item. Item tracking and visual characteristics could identify visual characteristics of unscanned items that are not part of the hand, detect whether the item is entering or exiting the bag and coupled with the weight change of the scales (before and after the action), cause an employee to be alerted and/or signal the customer to rescan all items in the bag. Also, the system could be set up so that bag rearranging is not allowed. Bag rearranging would be detected by anything entering the bag and/or bag weight variation when nothing was scanned.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing self checkout in a minimum of store floor space, the method comprising:

utilizing an imaging scanner to image products being purchased;

providing a bag rack with scales substantially adjacent the imaging scanner for holding a bag to receive imaged products; and utilizing a computer system to process data from the imaging scanner and the bag rack to ensure complete and secure product purchasing; and further utilizing the computer system to process image data from the product imaging scanner to track movement of each imaged product relative to the bag rack and determine whether each imaged product is entering or exiting the bag, wherein utilizing the computer system to process image data from each imaged product to track movement of each imaged product relative to the bag rack comprises the computer system:

continually processing one or more frames of video images associated with a given imaged product;

based on the one or more frames of video images, determining the direction of movement for the given imaged product;

determining whether the given imaged product is entering or exiting the bag located on the bag rack;

tracking the given imaged product into the bag immediately following a scanning of the imaged product by the image scanner;

if the given imaged product is moving toward the bag, determining, based on visual characteristics and the tracking, whether the given imaged product was scanned before entering the bag; and generating a warning signal if the given imaged product is moving toward the bag without being scanned.

2. The method of claim 1, wherein utilizing a computer system further comprises processing the product images from the imaging scanner to identify a given imaged product based on one of a plurality of stored visual characteristics.

3. The method of claim 2, further comprising processing image data from each imaged product to compare the image data with at least one other stored visual characteristic.

4. The method of claim 3, further comprising processing weight data from the bag rack to compare the weight data relative to stored weight characteristics for a given imaged product.

5. The method of claim 4, further comprising detecting potential fraudulent purchase activity based on the visual characteristics, image data, or weight data processing and producing negative comparison results.

6. The method of claim 2, wherein the stored visual characteristics comprise bar code data, texture data, shape data, and color data.

7. A method for secure self checkout in a small footprint self checkout system comprising:

integrating imaging and scanning of bar coded products as a single activity for self checkout;

requiring placement into a bag substantially immediately following the imaging and scanning of a product;

monitoring imaging, scanning, and placement for each scanned product to identify potential fraudulent self checkout; and utilizing a computer system to process image data from the product imaging scanner to track movement of each imaged product relative to the bag to determine whether each scanned product is entering or exiting the bag, wherein utilizing the computer system to process image data to track movement of a scanned product relative to the bag comprises the computer system:

continually processing one or more frames of video images associated with a given scanned product;

based on the one or more frames of video images, determining the direction of movement for the given scanned product;

tracking the given imaged product into the bag immediately following a scanning of the imaged product by the image scanner;

if the given imaged product is moving toward the bag, determining, based on visual characteristics and the tracking, whether the given scanned product is entering or exiting the bag; and generating a warning signal if the given imaged product is moving toward the bag without being scanned.

8. The method of claim 7, wherein monitoring further comprises processing bar code data from a scanned product to identify stored data for the scanned product, including visual and weight characteristics.

9. The method of claim 8, further comprising processing image data of the scanned product to compare with the visual characteristics.

10. The method of claim 9, further comprising processing weight data from the bag to compare the weight data relative to the weight characteristics.

11. The method of claim 10, further comprising detecting potential fraudulent purchase activity based on negative comparison results during the image data and weight data processing.

* * * * *